Sept. 15, 1959  D. M. WILLYOUNG  2,904,708
VENTILATION OF END TURN PORTIONS OF
GENERATOR MOTOR WINDING
Filed Dec. 18, 1957
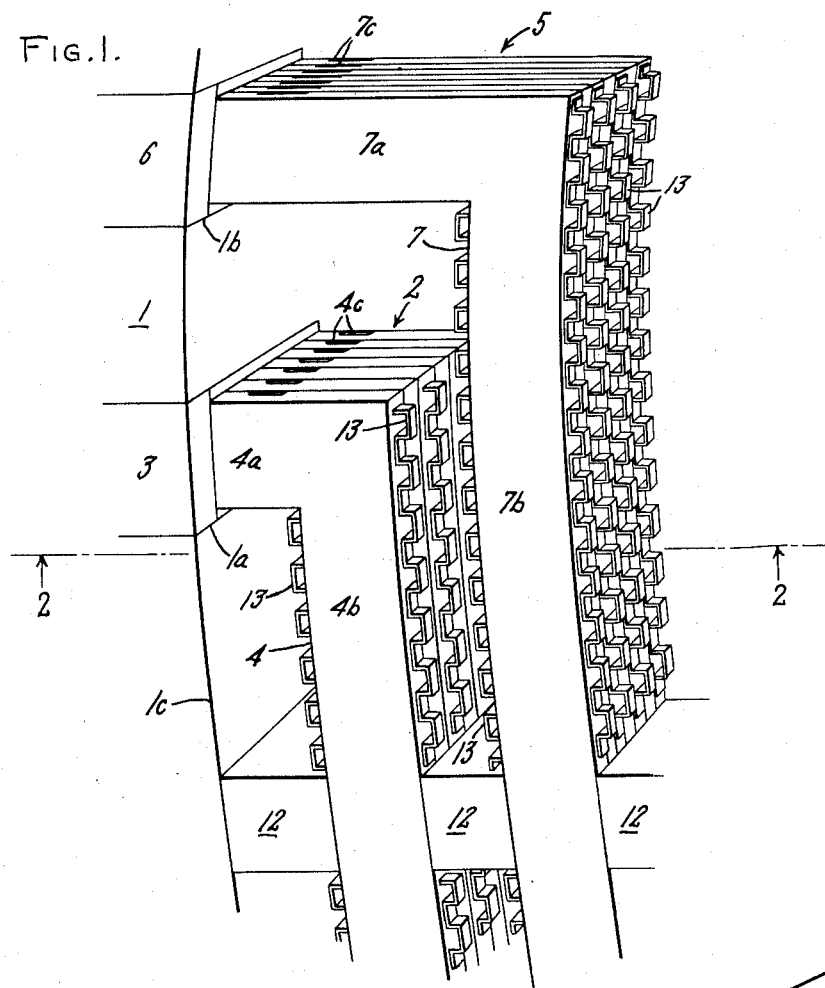
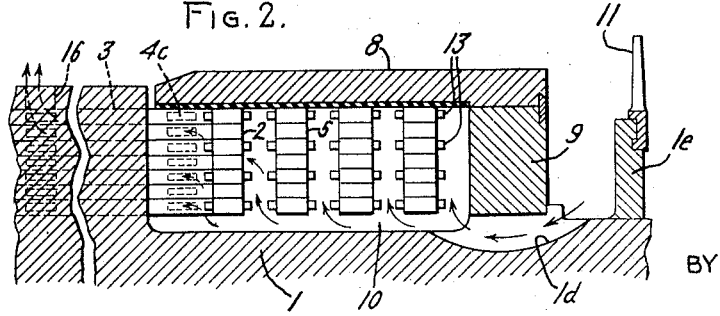
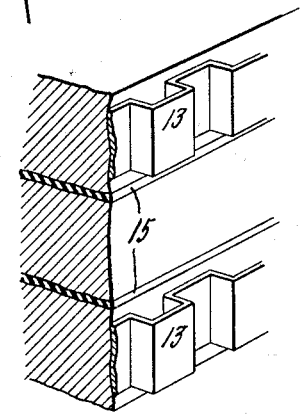
INVENTOR:
DAVID M. WILLYOUNG
BY
HIS ATTORNEY United States Patent Office
2,904,708
Patented Sept. 15, 1959

2,904,708
VENTILATION OF END TURN PORTIONS OF GENERATOR ROTOR WINDING

David M. Willyoung, Scotia, N.Y., assignor to General Electric Company, a corporation of New York Application December 18, 1957, Serial No. 703,651

5 Claims. (Cl. 310—64)

This invention relates to dynamoelectric machines, and more particularly to a method for cooling the end turn portions of the windings of a generator rotor.

It is well known that one of the main factors limiting the output of a large dynamoelectric machine, such as a turbine-generator, is the rise in temperature of the windings. In the case of rotor windings it has been the general practice to cool the end turn portions by circulating a cooling gas to carry the heat away by convection. This normally has been very satisfactory but with the advent of improved cooling methods for the slot portions of the rotor winding, the temperature rise of the end windings has become an important factor when determining the rotor rating. To increase the temperature of the end windings would tend to reduce the life of the insulation which obviously is an undesirable result.

Accordingly, it is an object of this invention to provide an improved cooling arrangement for reducing the temperature rise of the end turn portions of a rotor winding by increasing the effective cooling area of the end windings without substantially increasing the space occupied by the end turns.

Other objects and advantages will become apparent from the following description and accompanying drawings, in which Fig. 1 is a perspective view showing a portion of the end turns incorporating the invention;

Fig. 2 is a view taken along the lines 2—2 of Fig. 1; and

Fig. 3 is an enlarged view in perspective illustrating end turns with grids mounted thereon.

Generally stated, the invention is practiced by securing corrugated grid members to at least some end turn portions of the conductors to increase the effective cooling of the end turns exposed to the circulating cooling gas.

The invention is illustrated as being applied to a generator rotor 1, having winding receiving slots 1a, 1b and a distributed conductor, direct current field winding. Each pole of the field winding comprises a plurality of concentric coils 2, 5 spanning an unslotted pole center portion 1c.

Referring now more particularly to Fig. 1, it can be seen that the rotor coil 2 consists of a slot portion 3 and end turn 4 made up of a plurality of strands (see Fig. 2) having axial portions 4a and circumferentially extending portions 4b. The end turns are shown in Fig. 1 with a right angle corner between the axial portion 4a and circumferential portion 4b, but this is not essential, and the corner could be formed instead with large radii in the corners. Coil 5 is similar to coil 2 in that it consists of a slot portion 6 and end turn portions 7a, 7b. The end turns 4, 7 are axially located by spacer blocks 12 and maintained against transverse movement by blocks (not shown) located on each side of the pole center. The end turns 4, 7 are prevented from moving radially due to centrifugal force by retaining ring 8 which is secured to centering ring 9 that is in turn secured to rotor 1 in a conventional manner that is not a part of the present invention. For clarity, only two of the concentrically disposed rotor coils 4, 7 are drawn; although in practice several more are usually used. In Fig. 2, the coils have seven turns each, but such disclosure is illustrative only. Each strand is insulated from its adjacent conductors by insulation 15 (see Fig. 3).

In order to circulate the cooling gas through the rotor windings, gas is drawn in underspace 10 through subslots 1d, by the pumping action resulting from rotor rotation, which accelerates the gas as it moves from a smaller to a larger diameter, much like the action of a centrifugal fan. This pumping action can be augmented by pressure developed by a fan 11, which is secured to flange 1e of rotor 1. The combined action of the fan and rotor produces a differential pressure across the portions of the winding to be cooled causing cooling gas to flow. In the embodiment shown, the slot portions 3, 6 of coils 2, 5 respectively are hollow and they receive cooling gas through openings 4c, 7c in the end turn portions 4a, 7a. As shown in Fig. 2, the cooling gas flows axially through the slot portion of the winding to a radial exhaust passage 16 within the rotor body from where it is exhausted to outside the rotor.

To reduce the temperature rise in the end turns, and thus permit increased rotor rating, it becomes necessary to obtain more effective cooling from the limited cooling fluid available from the action of the fan and rotor.

In accordance with my invention, this is done by increasing the exposed cooling area of the end turns. To this end, a plurality of cooling fins such as corrugated grid members 13 are secured to the sides of the exposed end turns by brazing or soldering to the copper conductors. Simple grids, as shown in Fig. 1, are self-supporting against centrifugal force, but could be "dimpled" for added stiffness if desired. Grid members 13 are normally made of the same metal as the end turns; i.e., either copper or aluminum, to facilitate brazing the two together. In this way the grid members contribute a small amount of current-carrying area to the conductor as well. If desired, different heat conducting materials could be used for the grids, of course, provided that adequate joining methods were used to attach them securely to the main conductors.

As shown in Fig. 1, the grids have a substantially square cross-section and have a width in the radial direction approximately two-thirds the strand height. The grids are centered relative to the thickness of the end strands to prevent accidental contact between adjacent grids, which would constitute a "short circuit" between strands. However, with proper insulation the grids could extend the full radial height of the strands.

In the embodiment shown, the grids are located on both sides of the circumferential portions 4b, 7b of only the alternate conductors in the coil end turns 4, 7, and they extend substantially less than one-half the axial distance between adjacent end coils. With this arrangement the "unfinned" intermediate strands are cooled by conduction to the "finned" strands. However, if further reduction in end turn temperature is desired, cooling grids can be secured to every conductor, and may be used on both the axially and circumferentially extending sections of each end turn. The strands are insulated from each other by sheet insulation 15 (Fig. 3).

It may be advantageous to cool only the circumferentially extending parts of the winding 4b, 7b with the special grids, and control the temperature of the axial portions 4a, 7a of the coil end turns by locating the gas inlet ports 4c, 7c to the conductors close to the coil corners. However, as shown in Fig. 1, the gas inlet ports are uniformly located close to the end of the rotor body, and the temperature of the axial portions of the end turns is controlled merely by utilizing a larger cross-section of conductor over these sections than in the circumferential portions. With a larger cross sectional area the temperature rise in the axial portion would be less than in the small circumferential section. If the end turn portions of the conductors have a constant cross-section, the grids 13 would be secured to both the axial and circumferential portion of the end turn thus bringing about a uniform drop in temperature throughout substantially the entire end turn.

Although the grids constitute an obstruction to the flow of cooling gas in the space between the adjacent rows of end turns, it is found that they do not substantially affect the free convection flow pattern of the cooling gas supplied by fan 11 and rotor 1 until they extend so far as to cut off more than one half the width of the space between adjacent rows of end turns. Actually, in the embodiment shown, the improved cooling of the grid portions extending beyond the relatively stagnant layer of gas (i.e. "boundary layer") located adjacent the end turn substantially out-weighs the slightly reduced cooling of the end turns resulting from the reduction in the space available for receiving the cooling gas.

The amount of heat dissipated by these grids depends on the temperature differential between the grid and the cooling gas. As can be appreciated by those familiar with heat transfer problems, the temperature reduction accomplished by utilizing grids is dependent on the material the grid is made of, the thickness of the grid and the distance that it extends out from the high temperature end turn. The ratio of the cooling of the end turns by the grids to the equivalent cooling of the end turns is commonly referred to as the "fin effect." In the embodiment illustrated, with a grid construction made of the same material as the end turns and having a cross-section approximately ¼" x ¼", the "fin effect" per unit area would be approximately 95%. Thus, with a grid made of a material having low resistivity, the temperature in the grid will be substantially equal to that of the bar and thus utilizes substantially the full temperature differential between the bar and the cooling gas for cooling the grid. As mentioned earlier, grids made of other materials having higher resistivity would result in proportionately less effectiveness but would still function to give an advantage over a design in which no grids were employed.

It remains to note that the grids 13 extend circumferentially between the blocks 12 that are provided between adjacent end turns to give axial stability to the columns of end turns.

An example of the effectiveness of this construction can be seen from the following. Suppose cooling grids are used on both sides of the circumferential end strap 4b and only on every other turn. The grid design illustrated has a square cross-section and a "fin effect" of approximately 95%. For the conductors with the grids attached it can be seen that for each corrugation module, eight heat transfer surfaces are defined and exposed to the coolant whereas if the grid were not used only two of these defined surfaces would be present. Thus for a square-sectioned grid extending full depth of the turn the heat transfer area increase would be about 300%. However, since the grid is only used on one half the turns and extends only two thirds the depth of the bar and over only about five sixths of the peripheral length due to the blocks 12, the overall increase in heat transfer surface for this case is five sixths more than what it would be if the grids were not provided. This result can be seen from the following equation:

$$\begin{bmatrix} \text{Increase in} \\ \text{effective heat} \\ \text{transfer area} \\ 3 \end{bmatrix} \times \begin{bmatrix} \text{No. of} \\ \text{bars} \end{bmatrix} \times \begin{bmatrix} \text{Depth} \\ \text{of} \\ \text{grid} \\ ⅔ \end{bmatrix} \times \begin{bmatrix} \text{Circumferential} \\ \text{distance} \\ ⅚ \end{bmatrix} = ⅚ = 83\%$$

Since the temperature rise of the end winding is directly proportional to the watts per square inch of exposed cooling surface, this increase in cooling area can be translated to an increase in the allowable current rating of the end turns for the same temperature rise by taking the square root of the total cooling area. Since the total area in this case is 1.83, the allowable current rating of the end turns is increased by the square root of this or by 135% of that which is available with a rotor having end turns that do not use these grids.

Similarly, if grids were used on every conductor instead of every other conductor, the area increase would be 166%, the total area ratio would be 2.66, and the allowable current of the end turns could be increased to about 160% of that possible without the invention.

It is noted from the above that, for the same current, the use of grids results in a substantially reduced winding temperature, depending on the design of the grids and where they are used. For another example, although the increased capability would be substantially less, the grids could be employed on only one side of the bars and used on every third turn. Or, a cooling grid could be used on only one side of each strand, but on alternating sides to avoid interference or short-circuiting between grids. The invention is amenable to many other modifications.

Thus, it will be seen that the invention provides effective means for increasing the effectiveness of generator rotor end turn cooling, permitting a significant increase in the rating of the rotors of large turbine-generators.

It will be obvious to those skilled in the art that other changes and substitutions of equivalents might be made in the construction of the rotor ventilating cooling scheme disclosed herein. For example, the fin means can take many forms other than the square corrugations illustrated. It is, of course, desired to cover by the appended claims all such modifications as fall within the true spirit and scope of the invention.

What I claim as new and desire to secure by Letters Patent of the United States is:

1. A dynamoelectric machine rotor having winding slots, conductors disposed in said slots and including a plurality of axially spaced radially extending rows of circumferentially extending end turn portions, passage means supplying cooling gas to the radially extending spaces defined between adjacent rows of end turns, and cooling fin means secured in heat transfer relation to the end turn portions of the conductors and extending into said spaces for increasing the heat transfer surface of the end turns exposed to the cooling gas to reduce the temperature of the winding end turn portions.

2. A rotor for a dynamoelectric machine having winding slots, conductors disposed in said slots and defining a plurality of axially spaced radially extending rows of circumferentially extending end turn portions, passage means supplying cooling gas to the radially extending spaces between the rows of end turns to cool them, and corrugated grid means secured in heat transfer relation to at least some of the end turn portions of the conductors for increasing the effective cooling area thereof.

3. In a dynamoelectric machine rotor having conductors disposed in axial slots in the rotor body and which conductors define a plurality of axially spaced radially extending rows of circumferentially extending conductor end turns, means for insulating adjacent end turns, and means for providing cooling gas to the spaces defined between the rows of end turns, the combination of corrugated metal grid members secured in heat transfer relation to at least one side of at least every other end turn strand for increasing the effective cooling area thereof, the grids projecting less than half the axial distance between adjacent rows of end turns to minimize resistance to cooling flow and extending less than the full radial height of the strand to prevent contact with radially adjacent strands, 4. A dynamoelectric machine rotor having winding slots, conductors disposed in said slots and having a plurality of axially spaced radially extending rows of end turn strands with circumferentially extending portions, means supporting the rows of end turn strands in axially spaced relation, means supplying cooling gas to the radially extending spaces between the adjacent rows of strands to cool them, corrugated metal grid means secured in heat transfer relation to at least one side of at least every other strand to increase the effective cooling area of said turns to reduce the temperature of the rotor winding, the corrugations extending substantially radially and defining a polygonal cross-section in a plane normal to the radius of the rotor and extending less than half the axial distance between the adjacent rows of end turns to cut down their resistance to cooling flow.

5. A dynamoelectric machine rotor member having winding slots, hollow conductors disposed in said slots and having a plurality of axially spaced radially extending rows of end windings including both axially and circumferentially extending portions disposed outside of the rotor member at at least one end, support means disposed between said rows of conductor end portions for maintaining the alignment of said rows, a retaining ring surrounding the end turns for maintaining them in place against the action of centrifugal force, means supplying cooling gas to the radially extending spaces between the adjacent rows, the combination of corrugated grid means secured to some of said end windings for increasing the effective cooling area thereof, the corrugations extending substantially radially and having a square cross-section in a plane normal to the radius of the rotor and extending less than one half the axial distance between adjacent rows to minimize their resistance to the flow of cooling gas, inlet means in the axially extending portion of the end turn for admitting cooling gas from the end turn portion of the rotor to the hollow conductors, and outlet means extending through an intermediate portion of the rotor and interconnecting the hollow conductors with the outside of the rotor for venting the cooling gas after it has blown partially through the slot-lying hollow conductor coil side portions.

References Cited in the file of this patent

UNITED STATES PATENTS

| | | |
|---|---|---|
| 1,267,996 | Field | May 28, 1918 |

FOREIGN PATENTS

| | | |
|---|---|---|
| 509,996 | France | Aug. 28, 1920 |
| 517,435 | Germany | Feb. 5, 1931 |